US012745778B2

(12) United States Patent
Murphy

(10) Patent No.: US 12,745,778 B2
(45) Date of Patent: Sep. 29, 2026

(54) REMOVABLE BASE FOR CAKE PAN

(71) Applicant: Brian Murphy, Katonah, NY (US)

(72) Inventor: Brian Murphy, Katonah, NY (US)

( * ) Notice: Subject to any disclaimer, the term of this patent is extended or adjusted under 35 U.S.C. 154(b) by 665 days.

(21) Appl. No.: 18/324,322

(22) Filed: May 26, 2023

(65) Prior Publication Data

US 2024/0389604 A1 Nov. 28, 2024

(51) Int. Cl.
*A21B 3/13* (2006.01)

(52) U.S. Cl.
CPC .................................... *A21B 3/137* (2013.01)

(58) Field of Classification Search
CPC ........... A21B 3/13; A21B 3/137; A21B 3/135; A21B 3/132; A21B 3/18; A21B 3/133; A21B 3/134; A21B 3/139; A21B 5/02; A47J 31/20; A47J 37/01; A47J 43/20; A47J 37/04; A47J 47/01; A47J 2202/00; A47J 27/002; A47J 27/004; A47J 27/13; A47J 31/0626; A47J 31/0636; A47J 31/4403; A47J 31/521; A47J 31/525; A47J 31/5253; A47J 31/605; A47J 36/022; A47J 37/041; A47J 43/18; A47J 43/28; A47J 47/02
USPC ......... 99/426, 279, 287, 428, 441, 442, 295, 99/297, 319
See application file for complete search history.

(56) References Cited

U.S. PATENT DOCUMENTS 1,727,257 A * 9/1929 Stratton ................. A21B 3/137 249/DIG. 1
2,135,342 A 11/1938 Jackson
2,203,091 A 6/1940 Hutchinson
2,486,489 A * 11/1949 Mcdermott ........ D01D 10/0418 57/76
3,126,948 A 3/1964 Springer et al.
3,141,400 A 7/1964 Powers
3,182,397 A 5/1965 Entenmann
5,538,217 A 7/1996 Chauhan
5,932,098 A * 8/1999 Ross ..................... A47J 31/605 210/473
7,163,185 B2 1/2007 Dail
8,490,553 B1 7/2013 English et al.
8,789,460 B1 * 7/2014 Smith ...................... A21B 3/13 99/428
9,107,421 B2 * 8/2015 Campbell .............. A21B 3/135
10,827,768 B2 11/2020 Jones et al.
10,874,258 B2 12/2020 Etheridge
2005/0092189 A1 5/2005 Hall
2006/0175527 A1 8/2006 Morgan
2012/0007264 A1 1/2012 Kondou et al.
2012/0067902 A1 3/2012 Maffei
2013/0200081 A1 8/2013 Wilkinson
2017/0086608 A1 * 3/2017 Butler .................... A47G 19/00
2019/0380352 A1 * 12/2019 Charm ................... A21D 13/48

* cited by examiner

*Primary Examiner* — Chris Q Liu

(74) *Attorney, Agent, or Firm* — Dunlap Bennett & Ludwig PLLC; Anna L. Kinney

(57) ABSTRACT

A baking mechanism includes a base, an elongated shaft having opposite end portions, and a handle. The base defines a configuration and a surface area which are equivalent to the configuration and surface area of an inner bottom surface of a baking pan. The base also defines at least one through bore or aperture having internal threads. One end portion of the shaft is threadedly connected to the base by the internal threads. The handle is removable by removing the shaft from the base.

5 Claims, 3 Drawing Sheets

REMOVABLE BASE FOR CAKE PAN

FIELD

The present subject matter, directed in general to cake pans, is more particularly directed to a removable base for cake pans with which cakes or other baked dessert products are easily removed.

BACKGROUND OF THE INVENTION

U.S. Pat. No. 10,874,258 to Etheridge discloses a cake pan inversion tool and stand. U.S. Pat. No. 10,827,768 to Jones et al. discloses a pan system for selectively releasing a food product. US publication 2013/0200081 to Wilkinson discloses a baking pan including a body and a detachable base. The body includes at least one wall. The base includes a rigid portion and a flexible seal. The seal is located between the rigid portion and the body. U.S. Pat. No. 8,490,553 to English et al. discloses a cake stacker system including a base plate and lower and upper cake support plates. The base plate has a center and a periphery. The lower and upper cake support plates have centers and peripheries and central apertures. A center post extends through the center apertures and is coupled to the base plate and the upper cake support plate. A plurality of dowels, coupled to the lower cake support plate and the upper cake support plate, extend downwardly therefrom. U.S. Pat. No. 2,486,489 to McDermott discloses a tool to lift and remove a cake from a pan.

The present subject matter enables a cake or other baked product to easily be removed from a baking pan without requiring the pan itself to be made of multiple parts as disclosed in U.S. Pat. No. 9,107,421 to Campbell et al. (directed to a baking pan system), U.S. Pat. No. 5,538,217 to Chauhan (for a ring-cake preparation system), and U.S. Pat. No. 3,141,400 to Powers (directed to an expandable cake pan), or complex mechanisms for lifting-and-removing a cake from a pan as shown in U.S. Pat. No. 2,486,489 to McDermott.

Moreover, for cake requiring baking in a water bath, current baking pans, including springform pans, must be adapted or configured to prevent water damaging the cakes, which is difficult to achieve, often requiring surrounding a pan in foil to make it waterproof.

Therefore, based on problems noted above and other problems experienced when baking, many bakers will appreciate an improved mechanism to remove cake from a pan.

SUMMARY OF THE INVENTION

Accordingly, one aspect of the present subject matter includes an improved cake baking mechanism used with a cake pan having an inner bottom surface of predetermined configuration and defining a predetermined surface area, wherein the cake pan includes a sidewall unitary with the bottom surface and disposed transverse to the bottom surface.

The present improvement consists essentially of a base; an elongated shaft having opposite end portions; and a handle. The base defines a configuration and a surface area which are equivalent to the configuration and surface area of the inner bottom surface of the cake pan. The base also defines at least one through bore or aperture having internal threads. One end portion of the shaft is threadedly connected to the base by the internal threads thereof. The handle is removably connected to the other end portion of the shaft.

Additional aspects of the present subject matter shall be described in detail below.

DETAILED DESCRIPTION OF THE INVENTION

Broadly, one embodiment of the present invention is a baking pan insert having a base conformed to the base of the baking pan with a detachable handle extending from a threadedly detachable rod or shaft.

The handle and shaft may be centrally located and may have a T-shaped configuration. As the circumference of the base substantially seals the sidewall of the baking pan, a vacuum may form below the base which makes it hard to get a cake out of the pan. Therefore, in some embodiments, the shaft may be formed as a hollow tube, allowing air to get under the insert base as it is being removed from the pan. In some instances, the handle may also be formed as a hollow tube, forming an airspace fluidly connected to an airspace within the shaft. In some embodiments, the baking pan insert may have more than one spaced apart handle-and-shaft component, e.g., to lift a sheet cake more easily out of the baking pan.

The materials of manufacture are not particularly limited. Preferably, the baking pan insert is manufactured of non-stick, ovenproof material.

Figure 3:
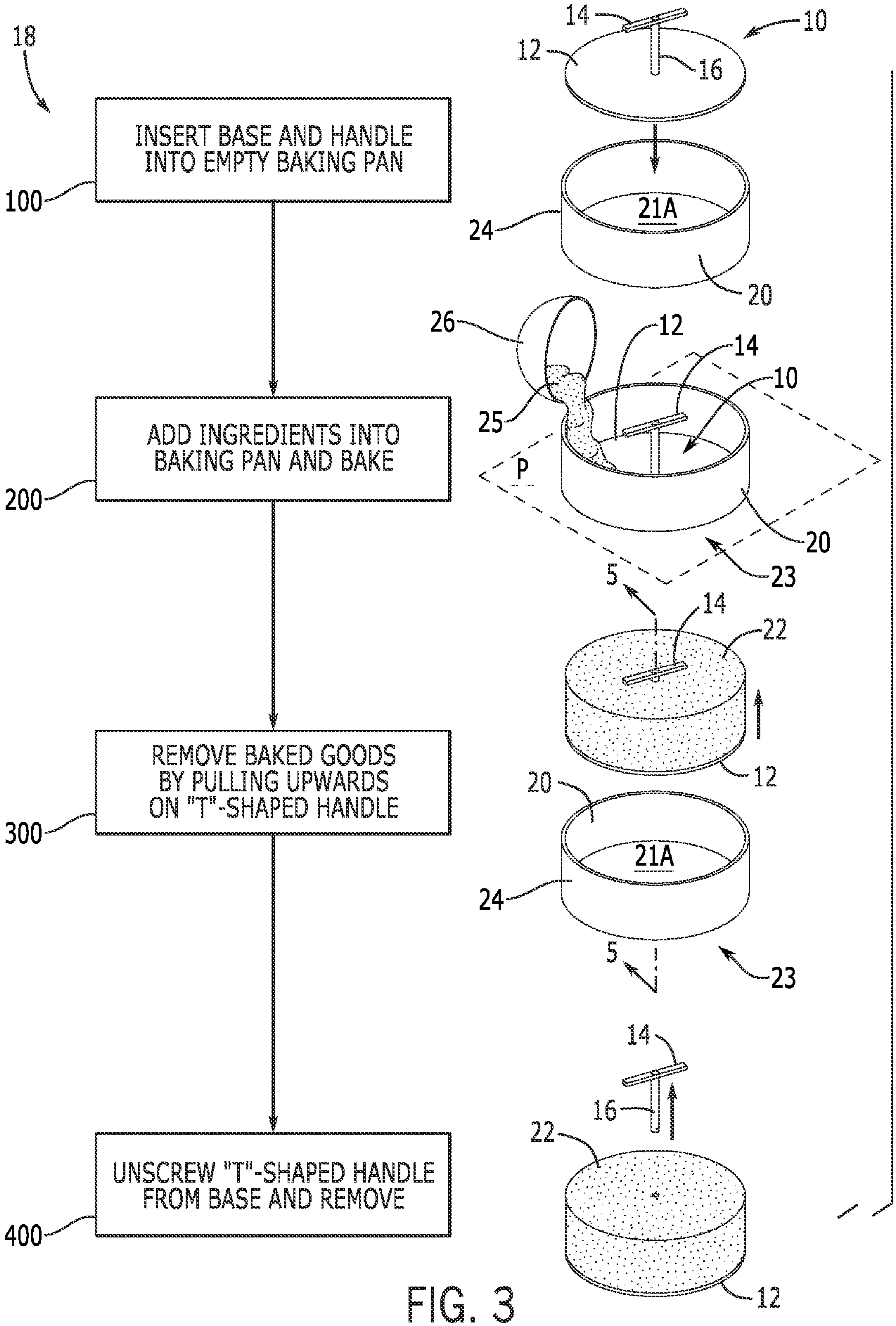
FIG. 3 presents on the left, a flow diagram of four blocks, and on the right, miniature portraits of components of an improved mechanism associated with each block, in which the third block miniature presents a plane 5-5 for providing the sectional view of FIG. 5.

While the illustrated embodiment of the present subject matter depicts a cylindrical baking pan 20, low in height, having an inner bottom surface 21, as shown in FIG. 3, a person of ordinary skill in the art ("POSITA") can understand that many other baking pans, wherein the inner bottom surface is, e.g., triangular, square, rectangular, pentagonal, hexagonal, octagonal, or elliptical can be used with the improvement summarized above.

Also, while the present embodiment shows a baking pan 20 having a circular bottom 23 and a cylindrical sidewall 24 orthogonally oriented relative to the bottom 23, a POSITA can understand that an area of a plane P oriented parallel to the bottom surface 21 could increase when a spacing between the plane P and bottom surface 21 increases.

Figure 1:
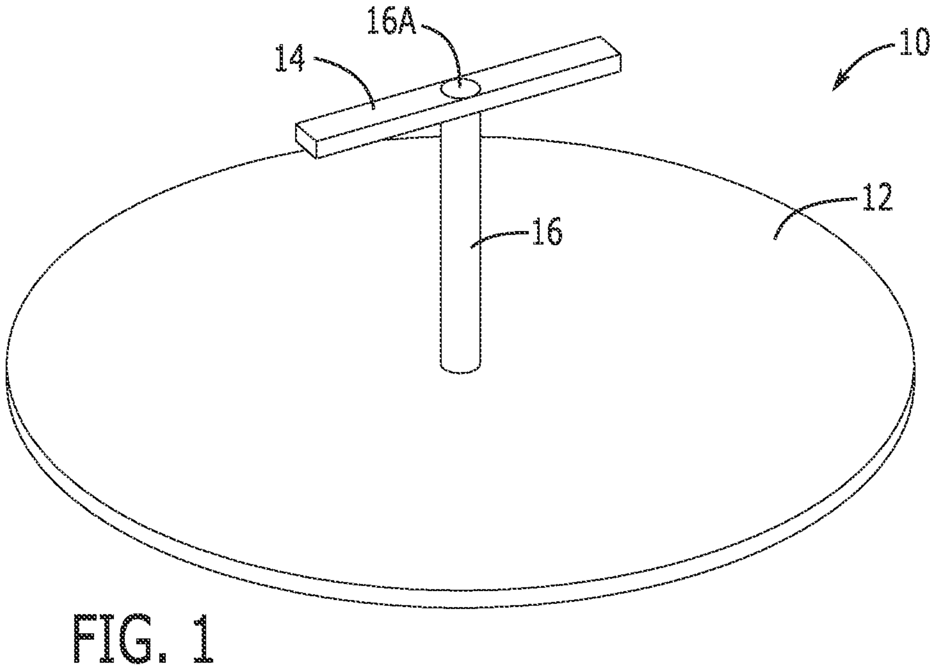
FIG. 1 depicts a perspective view of a cake pan base for the present subject matter.
Figure 2:
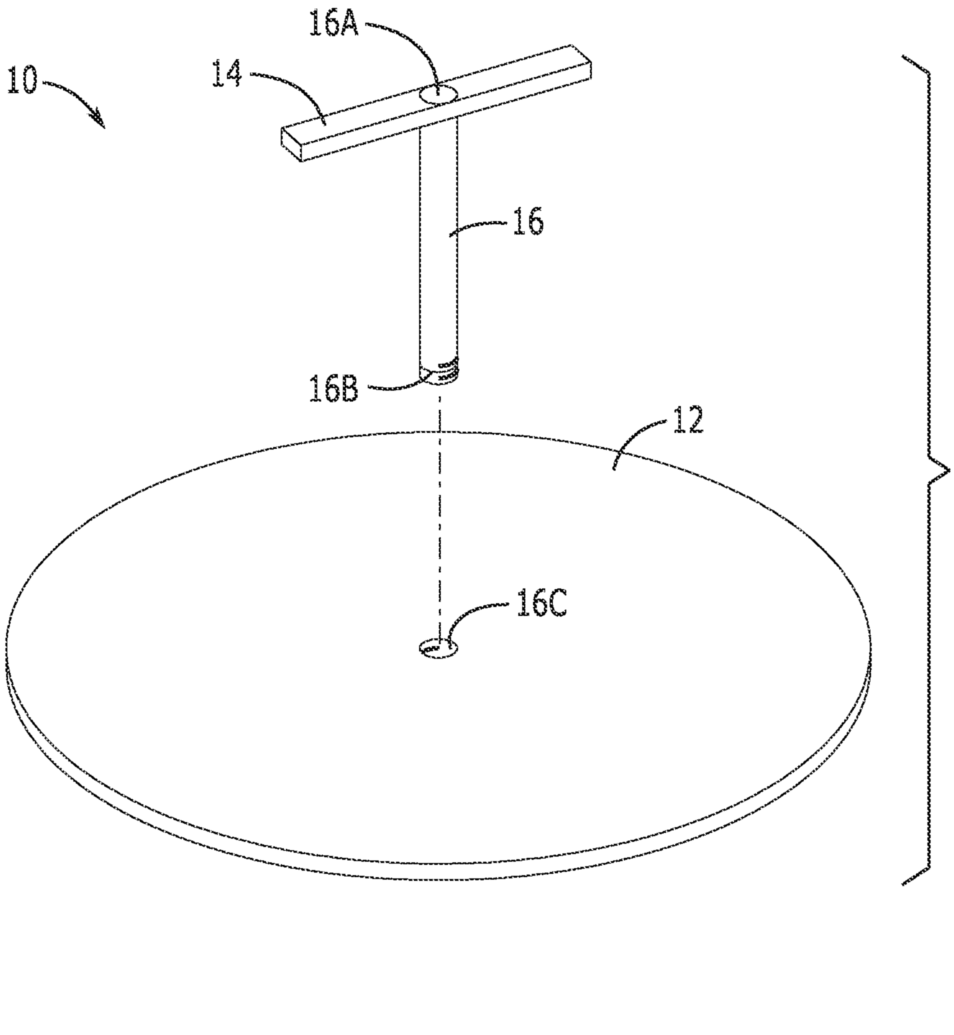
FIG. 2 is an exploded and perspective view of the cake pan base shown in FIG. 1.

Referring to FIGS. 1, 2 an improved cake baking mechanism 10—to be used with a baking pan 20 having an inner bottom surface 21 (of predetermined configuration defining a predetermined surface area A) and a sidewall 24 disposed transverse to the bottom surface 21—is described as follows.

The present improvement consists essentially of a base 12; an elongated shaft 16 having opposite end portions 16A, 16B; and a handle 14.

The base 12 defines a configuration and a surface area which are equivalent to the configuration and surface area of the inner bottom surface 21 of the baking pan 20.

Figure 4:
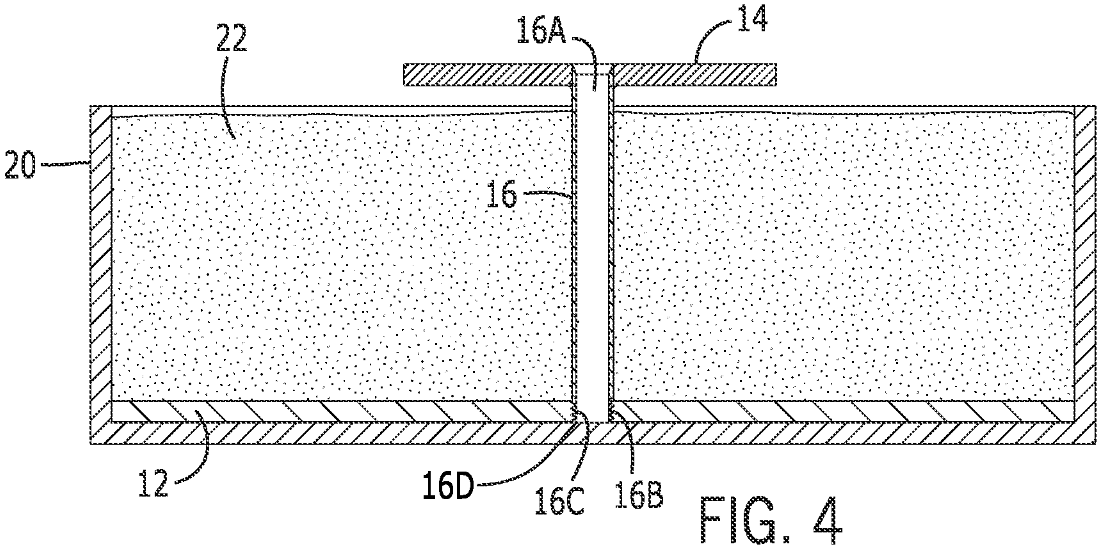
FIG. 4 is a sectional view of assembled components of the improved mechanism.
Figure 5:
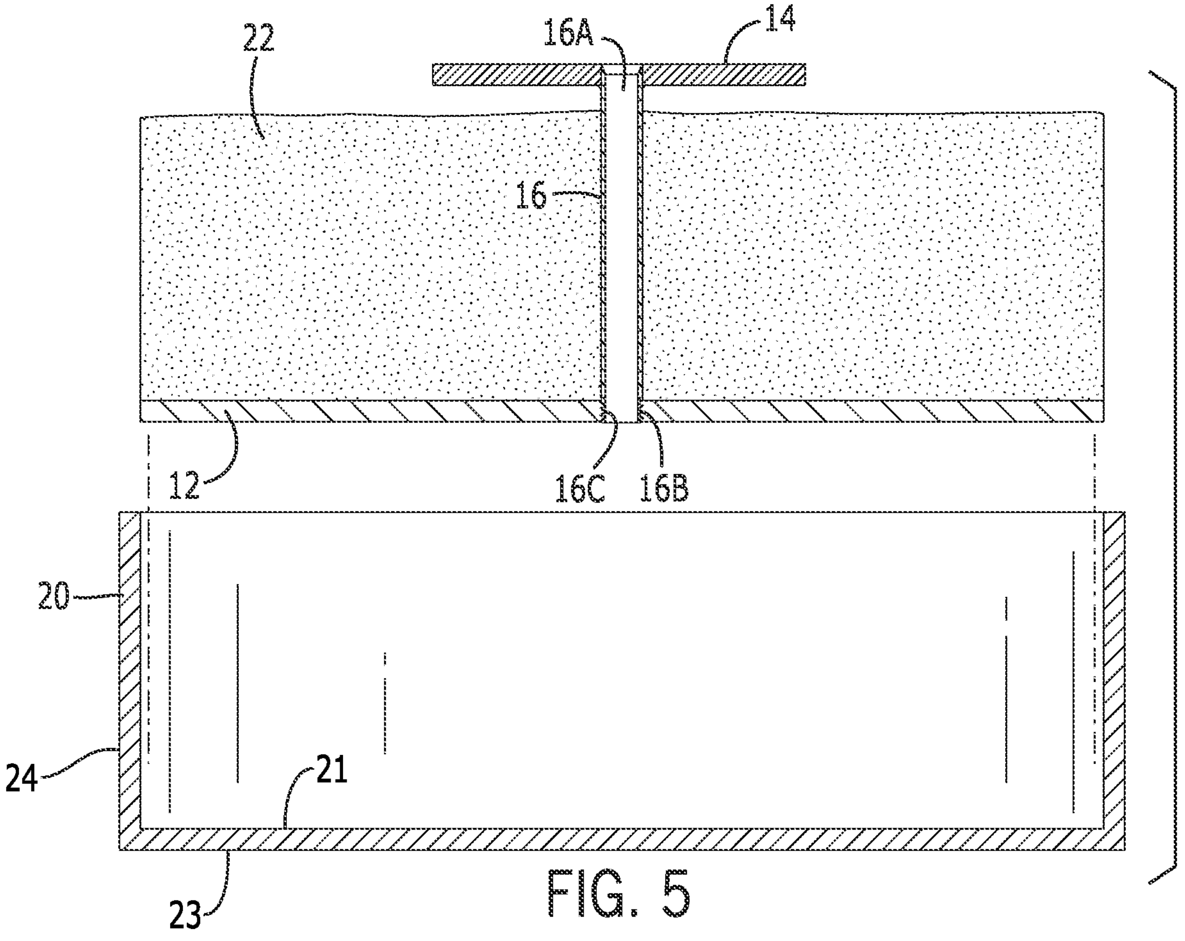
FIG. 5 is a sectional view, on an enlarged scale, taken from the plane 5-5 of a miniature portrait associated with the third block of FIG. 3, in which improved mechanism components, shown separated in FIG. 5, are assembled for the sectional view of FIG. 4.

The base 12 also defines at least one through bore or aperture 16C (FIG. 2) having internal threads 16D (FIG. 5). One end portion 16B (FIG. 2) of the elongated shaft 16 is threadedly connected to the base 12 by the internal threads 16D. (See, e.g., FIGS. 4, 5) Handle 14—preferably T-shaped—is connected to the other end portion 16A of shaft 16.

Referring next to FIG. 3, an improved method 18 for baking a cake or other dessert product is described as follows. The method 18 includes inserting a base 12 having a handle 14 into an empty baking pan 20, as shown in step 100, adding cake or other dessert product ingredients 25 (preferably from a bowl 26) into the baking pan 20, and baking the cake or the other dessert product ingredients 25 to produce a baked cake 22 or other baked dessert product, as shown in step 200. The improvement consists essentially of the following steps: (1) using the handle 14 to remove the baked cake 22 or the other baked dessert product from the pan 20, wherein the handle 14 is threadedly removably connected by shaft 16 to the base 12, as suggested by step 300 (FIG. 3) and shown in FIGS. 1, 2; (2) unscrewing and separating handle 14 from the base 12, as noted in step 400 (FIG. 3) and in FIGS. 1, 2; and (3) removing the handle 14 and the shaft 16 still screwed to the handle 14 from the baked cake 22 (or other baked dessert product), as noted in step 400.

Described in detail in this patent specification is an improved cake baking mechanism. While the present subject matter is described with reference to an illustrated embodiment, the present subject matter is not limited to the present embodiment. On the contrary, many alternatives, changes, and/or modifications shall become apparent to a person of ordinary skill in the art ("POSITA") after this patent specification and its accompanying figures are reviewed. Therefore, all such alternatives, changes, and/or modifications are to be considered as constituting a part of this disclosure of the present subject matter insofar as they fall within the spirit and the scope of the appended claims.

What is claimed is:

1. A cake baking system, comprising:

a cake pan having a bottom wall, defining an inner bottom surface having a predetermined configuration and a predetermined surface area, and a sidewall disposed transverse to the bottom wall; and a removable baking mechanism comprising:

an apertured base conforming to the predetermined configuration and the predetermined surface area of the inner bottom surface of the cake pan, wherein at least one aperture of the base includes internal threads;

a shaft having opposite end portions and a through hole between the opposite end portions, wherein one of the end portions is threadedly connected to the base by the internal threads of the at least one aperture; and a handle secured to the other one of the end portions of the shaft.

2. The cake baking system of claim 1, wherein the handle and shaft are joined in a T-shape.

3. The cake baking system of claim 1, wherein the shaft is tubular, with a sidewall defining an airspace therein configured to prevent vacuum formation between the base and the cake pan during removal of the removable baking mechanism from the cake pan.

4. The cake baking system of claim 1, wherein the predetermined configuration is triangular, square, rectangular, pentagonal, hexagonal, octagonal, elliptical, or circular.

5. A method for baking a dessert product, comprising:

providing the cake baking system of claim 1;

inserting the removable baking mechanism into the cake pan;

adding selected ingredients into the cake pan on the apertured base;

baking the selected ingredients in the cake baking system to produce a baked dessert product;

using the handle to remove the removable baking mechanism with the baked dessert product from the cake pan;

unscrewing and separating the shaft from the apertured base; and removing the shaft from the baked dessert product.

* * * * *